ns011297508B1

United States Patent
Jiang et al.

(10) Patent No.: US 11,297,508 B1
(45) Date of Patent: Apr. 5, 2022

(54) SPECIFIC COMMUNICATION EMITTER IDENTIFICATION METHOD BASED ON AN INSTANTANEOUS ENVELOPE EQUIPOTENTIAL CONSTELLATION TRACE FIGURE

(71) Applicants: STATE GRID WUYI COUNTY POWER SUPPLY COMPANY, Zhejiang (CN); STATE GRID JINHUA POWER SUPPLY COMPANY, Zhejiang (CN)

(72) Inventors: Hongliang Jiang, Zhejiang (CN); Shenhua Wang, Zhejiang (CN); Zhen Lin, Zhejiang (CN); Shaohua He, Zhejiang (CN); Yangyi Zheng, Zhejiang (CN); Xiaofang Fang, Zhejiang (CN); Yulong Ying, Zhejiang (CN); Qi Lv, Zhejiang (CN); Huaqing He, Zhejiang (CN); Xiangwei He, Zhejiang (CN); Hui Wu, Zhejiang (CN); Ting Wang, Zhejiang (CN); Baoliang Cao, Zhejiang (CN); Jun Cao, Zhejiang (CN); Chao Peng, Zhejiang (CN)

(73) Assignees: STATE GRID WUYI COUNTY POWER SUPPLY COMPANY, Zhejiang (CN); STATE GRID JINHUA POWER SUPPLY COMPANY, Zhejiang (CN)

( * ) Notice: Subject to any disclaimer, the term of this patent is extended or adjusted under 35 U.S.C. 154(b) by 0 days.

(21) Appl. No.: 17/377,361

(22) Filed: Jul. 15, 2021

(30) Foreign Application Priority Data

Dec. 4, 2020 (CN) .......................... 202011407444.9

(51) Int. Cl.
*H04W 12/79* (2021.01)
*G06N 3/04* (2006.01)
(Continued)

(52) U.S. Cl.
CPC ........ *H04W 12/79* (2021.01); *G06K 9/00536* (2013.01); *G06N 3/04* (2013.01); *G06T 11/40* (2013.01)

(58) Field of Classification Search
CPC ..... H04W 12/79; G06K 9/00536; G06N 3/04; G06T 11/40
See application file for complete search history.

(56) References Cited

U.S. PATENT DOCUMENTS

| 11,032,022 | B1* | 6/2021 | Sen | ......... G06N 20/00 |
| 2007/0025245 | A1* | 2/2007 | Porras | ........ H04W 99/00 370/229 |
| 2015/0049666 | A1* | 2/2015 | Montalvo | ........ H04W 88/10 370/328 |

OTHER PUBLICATIONS

Quadrature amplitude modulation, Liu et al., 2014; https://www.nature.com/articles/ncomms6911.pdf (Year: 2014).*

(Continued)

*Primary Examiner* — Jianxun Yang
(74) *Attorney, Agent, or Firm* — Jcip Global Inc.

(57) ABSTRACT

Disclosed is a specific communication emitter identification method based on an instantaneous envelope equipotential constellation trace figure, including: selecting a specific communication emitter and acquiring its radio frequency signal fragment, performing instantaneous envelope extraction to the radio frequency fragment, and representing the instantaneous envelope with a constellation trace figure using a constellation trace figure two-dimensional visualization method, wherein the constellation trace figure serves as a radio frequency fingerprint of a transmitter, and inputting the radio frequency fingerprint into a classifier to (Continued)

identify. The disclosure overcomes drawbacks in conventional technologies.

9 Claims, 6 Drawing Sheets

(51) Int. Cl.
 *G06K 9/00* (2022.01)
 *G06T 11/40* (2006.01)

(56) References Cited

OTHER PUBLICATIONS

Vector Signal Analyzer, Rohde&Scharz, 2004; https://cdn.rohde-schwarz.com.cn/pws/dl_downloads/dl_common_library/dl_brochures_and_datasheets/pdf_1/FSQ-K70_bro_en.pdf (Year: 2004).*

* cited by examiner

SPECIFIC COMMUNICATION EMITTER IDENTIFICATION METHOD BASED ON AN INSTANTANEOUS ENVELOPE EQUIPOTENTIAL CONSTELLATION TRACE FIGURE

CROSS-REFERENCE TO RELATED APPLICATION

This application claims the priority benefit of China application serial no. 202011407444.9, filed in Dec. 4, 2020. The entirety of the above-mentioned patent application is hereby incorporated by reference herein and made a part of this specification.

FIELD

Embodiments of the present disclosure relate to the field of specific communication emitter identification, and more particularly relate to a specific communication emitter identification method based on an instantaneous envelope equipotential constellation trace figure.

BACKGROUND

Information security is crucial in building a reliable and robust IoT (Internet of Things). With constant outbreak of information security issues brought by wireless communication networks, it is top priority to accurately identify and authenticate an IoT object to prevent user identity fraud and device cloning. A traditional authentication mechanism is implemented in the application layer; however, this application-layer authentication mechanism poses risks such as protocol security loopholes and key exposures. Although the traditional authentication mechanism may guarantee information security to a certain extent, it is not suitable for handling a large-scale network and the mass data brought thereby and thus can hardly satisfy the IoT's requirements on information security. Therefore, to ensure robust operation of the IoT, there needs a low-error-rate, efficient, low-cost specific communication emitter identification method. Physical-layer authentication is one of core technologies ensuring wireless communication security. In addressing information security problems, the physical-layer authentication has advantages such as a faster authentication speed, a lower complexity, and a higher compatibility than the application-layer authentication, without a need to execute various protocols. Radio frequency fingerprint (RFF) identification is a keyless authentication method based on device physical layer hardware, which does not consume extra computational resources or require embedding of additional hardware and is thus a promising technology to construct a lower-cost, more concise, more secure identification and authentication system.

However, it is still a challenge to extract a radio frequency fingerprint with unique native attributes, and the extracted fingerprint is still restricted by a plurality of factors, including radio frequency fingerprint generation mechanism, feature extraction, and feature selection.

SUMMARY

To overcome the above and other drawbacks in conventional technologies, embodiments of the present disclosure provide a specific communication emitter identification method based on an instantaneous envelope equipotential constellation trace figure.

Objectives of the present disclosure are implemented through the technical solutions below:

a specific communication emitter identification method based on an instantaneous envelope equipotential constellation trace figure, comprising:

Step 1: selecting a to-be-identified specific communication emitter, and acquiring, by a receiver, a radio frequency signal fragment of the specific communication emitter;

Step 2: performing instantaneous envelope fragment extraction to the radio frequency signal fragment of the specific communication emitter as acquired by the receiver, splitting the extracted instantaneous envelope fragment into two equal segments, and then representing the two equally split instantaneous envelope segments with a constellation trace figure using a constellation trace figure two-dimensional visualization method;

Step 3: computing point density on the constellation trace figure and coloring the constellation trace figure based on the point density to obtain a colored instantaneous envelope equipotential constellation trace figure for each segment of the radio frequency signal fragment, wherein the instantaneous envelope equipotential constellation trace figure serves as a radio frequency fingerprint for a transmitter;

Step 4: building a classifier, and inputting the radio frequency fingerprint of the transmitter obtained in step 3 into a classifier, thereby completing identification of specific communication emitter.

A segment of transient signal transmitted at the instance of switching on or off a wireless device is intercepted to be subjected to radio frequency fingerprint extraction. The transient signal does not include any data information, only reflecting hardware features of the transmitter. Thus, the transient signal is independent. For some very similar specific communication emitters, the information included in the transient signal may provide better identification and classification with respect to the specific communication emitter. Instantaneous envelope of the extracted transient signal is represented with a constellation trace figure. Coloring is implemented to the constellation trace figure. A classifier is leveraged to classify the specific communication emitter. The constellation trace figure image reveals a high distinctness and a high classification accuracy. The accuracy of classification and identification is significantly improved particularly for similar specific communication emitters (e.g., those of the same model and same lot from the same manufacture).

Furthermore, the radio frequency signal of the specific communication emitter acquired by the receiver in Step 1 refers to a transient signal.

Each device has a unique radio frequency fingerprint, which is hardware distinctness between devices. Such hardware distinctness is generally reflected in communication signals. The unique radio frequency fingerprint feature can be extracted out by analyzing the received radio frequency signal. A transient signal fragment refers to the signal segment transmitted when the received transmitter power rises from zero to the rated power. This signal segment does not include any data information, which is only related to device hardware characteristics. For highly similar specific communication emitters, such hardware characteristic distinctness may better distinguish between different transmitters.

Furthermore, the instantaneous envelope fragment in Step 2 is extracted using the Hilbert Transform.

Furthermore, extracting the instantaneous envelope fragment using the Hilbert Transform comprises steps of:

1.1 obtaining a radio frequency signal fragment as a real signal needed by resolving the instantaneous envelope;

1.2 subjecting the radio frequency signal to the Hilbert Transform in accordance with the equation below:

$$\hat{x}(t) = x(t) * \frac{1}{\pi t}$$

Where: x(t) denotes the radio frequency signal fragment, x̂(t) denotes the Hilbert Transformed radio frequency signal fragment, and t denotes the time when the radio frequency signal fragment is intercepted;

1.3 with the radio frequency signal fragment as the real part and the Hilbert Transformed radio frequency fragment as the imaginary part, building an analytic signal and substituting the radio frequency signal fragment into the analytic signal to resolve the absolute value, wherein the signal obtained by resolving the absolute value of the analytic signal is an envelope signal, which is computed in accordance with the equation below:

$$\begin{cases} \tilde{x}(t) = x(t) + j\hat{x}(t) \\ x(t) = A(t)\cos(\omega_0 t + \theta(t)) \\ \tilde{x}(t) = A(t)\cos(\omega_0 t + \theta(t)) + jA(t)\sin(\omega_0 t + \theta(t)) = \\ \quad A(t)e^{j(\omega_0 t + \theta(t))} = A(t)e^{j\theta(t)}e^{j\omega_0 t} \\ |\tilde{x}(t)| = |A(t)e^{j\theta(t)}| = |A(t)| \end{cases}$$

where: x̂(t) denotes the Hilbert Transformed radio frequency signal fragment, A(t) denotes amplitude component of the radio frequency signal fragment, $\cos(\omega_0 t+\theta(t))$ denotes phase component of the radio frequency signal fragment, $\sin(\omega_0 t+\theta(t))$ denotes phase component after the original signal of the radio frequency signal fragment is subjected to Hilbert Transform, $e^{j(\omega_0 t+\theta(t))}$ denotes the complex carrier signal derived after Euler transform, and $A(t)e^{j\theta(t)}$ denotes a complex envelope.

Furthermore, in Step 3, the constellation trace figure is colored by sliding a rectangular window function.

The colored constellation trace figure is more intuitive and distinct for identification and classification.

Furthermore, in Step 4, the classifier refers to a deep convolutional neural network classifier.

The deep convolutional neural network can directly convolve with image pixels so as to extract an image feature from the image pixels. Compared with conventional image feature extraction manners, this processing manner more resembles the processing manner of a human brain visual system and offers a higher classification accuracy.

Furthermore, building the deep convolutional neural network classifier includes steps as follows:

1.1 acquiring radio frequency signals of a plurality of to-be-identified specific communication emitters to obtain corresponding instantaneous envelope equipotential constellation trace figures based on the acquired radio frequency signals;

1.2 creating a dataset for training the deep convolutional neural network based on the obtained instantaneous envelope equipotential constellation trace figures of the radio frequency signals;

1.3 building a deep convolutional neural network model and training the deep convolutional neural network with the dataset, wherein the trained deep convolutional neural network model is the deep convolutional neural network classifier.

After training of the deep convolutional neural network classifier has been completed, a classifier verification sub-step needs to be further performed: selecting a plurality of specific communication emitters from among the specific communication emitters that have been used in training the deep convolutional neural network classifier, re-acquiring radio signals of the selected specific communication emitters, obtaining constellation trace figure verification images based on the selected radio frequency signals, inputting the obtained constellation trace figure verification images into the trained deep convolutional neural network classifier, and verifying classification accuracy of the deep convolutional neural network classifier.

The manner of classifier building based on to-be-identified specific communication emitters has a higher adaptability to different scenarios and thus has more extensive applications.

Further, the specific communication emitter identification method further comprises a step of optimizing the deep convolutional neural network classifier, the step specifically comprising:

S1: partitioning the constellation trace figure verification image of each training sample of a plurality of training samples included in a single specific communication emitter into 5 parts, which are respectively: head part of a first segment, intermediate part of the first segment, head part of a second segment, intermediate part of the second segment, and a connection part between the first segment and the second segment;

S2: computing pairwise similarities with respect to one of the parts of the plurality of training samples to obtain a plurality of similarities, computing the mean value of all similarities, and then computing variances between all similarities and the mean value, wherein a sum of the variances is taken as a confidence for the part;

S3: sorting the confidences of all parts in an ascending order, wherein a lower confidence indicates that the images with respect to a corresponding part are more similar, while a larger confidence indicates that the images with respect to a corresponding part are less similar; increasing identification weights for those parts with a lower confidence, and decreasing identification weights for those parts with a higher confidence.

Furthermore, in the classifier verification sub-step, if verification of a constellation trace figure verification image inputted in the trained deep convolutional neural network classifier fails, an error correction sub-step is performed, specifically comprising:

T1: partitioning the constellation trace figure verification image into 5 parts, which are respectively: head part of a first segment, intermediate part of the first segment, head part of a second segment, intermediate part of the second segment, and a connection part between the first segment and the second segment, and also partitioning the corresponding training sample constellation trace figure verification image into 5 parts, which are respectively: head part of a first segment, intermediate part of the first segment, head part of a second segment, intermediate part of the second segment, and a connection part between the first segment and the second segment;

T2: selecting each part of the test constellation trace figure to match with each corresponding part of all training sample constellation trace figures, and recording the numbers of times of successful matching of each part of the test constellation trace figure, wherein the number of times of successful matching refers to the number of times for the match confidence to be greater than a set threshold.

T3: if the numbers of times of successful matching of all parts of the test constellation trace figure are unexceptionally greater than the set threshold, determining that the test constellation trace figure is the real constellation trace figure of the corresponding specific communication emitter, wherein the test constellation trace figure serves as a training sample constellation trace figure; if there exists a part whose number of times of successful matching is less than the set threshold in a test constellation trace figure and the part's confidence is high or above average, determining that the test constellation trace figure is the real constellation trace figure of the corresponding specific communication emitter, wherein the test constellation figure serves as a training sample constellation trace figure; if there exists a part whose number of times of successful matching in a test constellation trace figure is less than the set threshold and the part's confidence is not high or above average, which indicates an error correction failure, checking the system by relevant personnel.

The present disclosure offers the following beneficial effects:

The classification and identification are performed based on the extracted transient signal of a specific communication emitter. The transient signal includes device hardware information, while even similar specific communication emitters are distinct in hardware information, and such hardware distinctness further leads to distinctness of the instantaneous envelope equipotential constellation trace figure formed by the transient information intercepted from the specific communication emitter. If a classifier built based on the deep convolutional neural network is leveraged to identify and classify the specific communication emitter, the identification accuracy may reach 100%, which significantly improves the identification rate of specific communication emitters. Particularly for some similar specific communication emitters (e.g., specific communication emitters of the same model and the same lot from the same manufacturer), by leveraging the instantaneous envelope equipotential constellation trace figure as the device's radio frequency fingerprint for identification and classification, a very high identification accuracy can also be achieved, and the radio frequency fingerprint technology's identification accuracy with respect to specific communication emitters is significantly improved.

DETAILED DESCRIPTION

Hereinafter, the present disclosure will be illustrated in further detail through embodiments with reference to the accompanying drawings.

Embodiment 1

Figure 1:
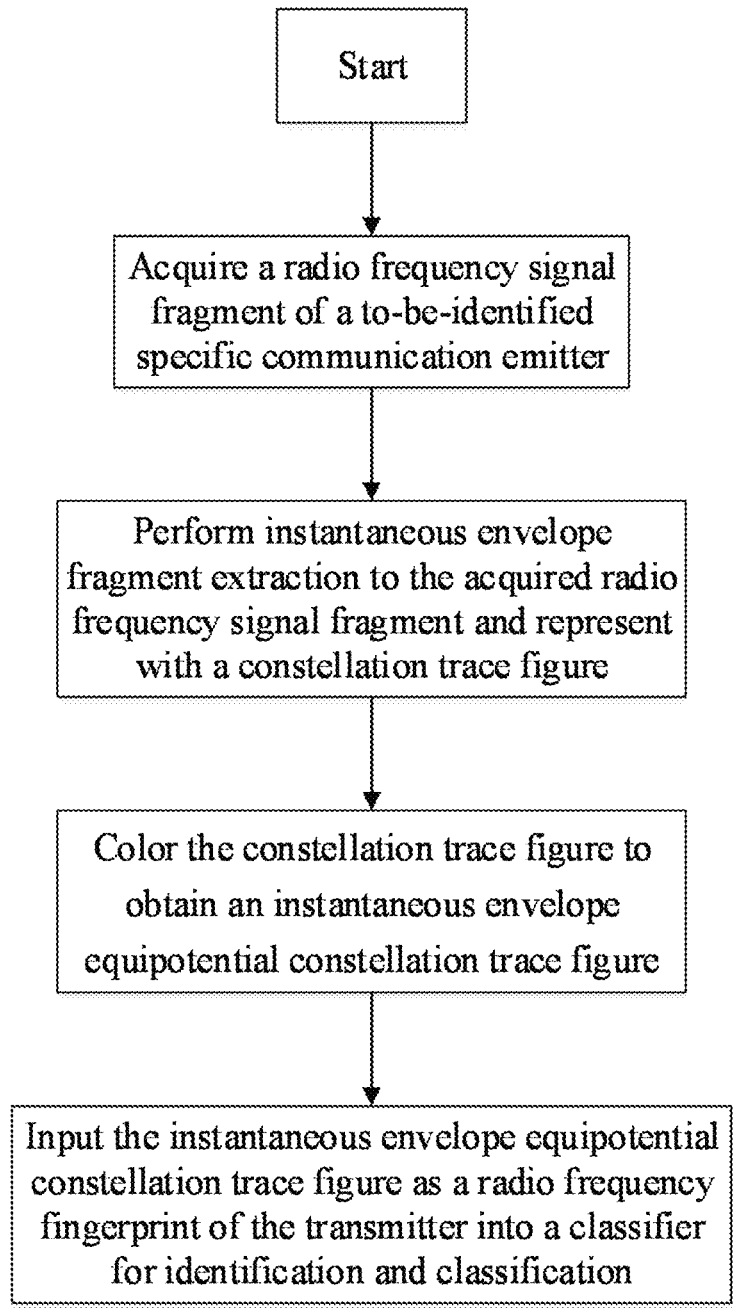
FIG. 1 shows a flow diagram of an embodiment of the present disclosure.
Figure 2A:
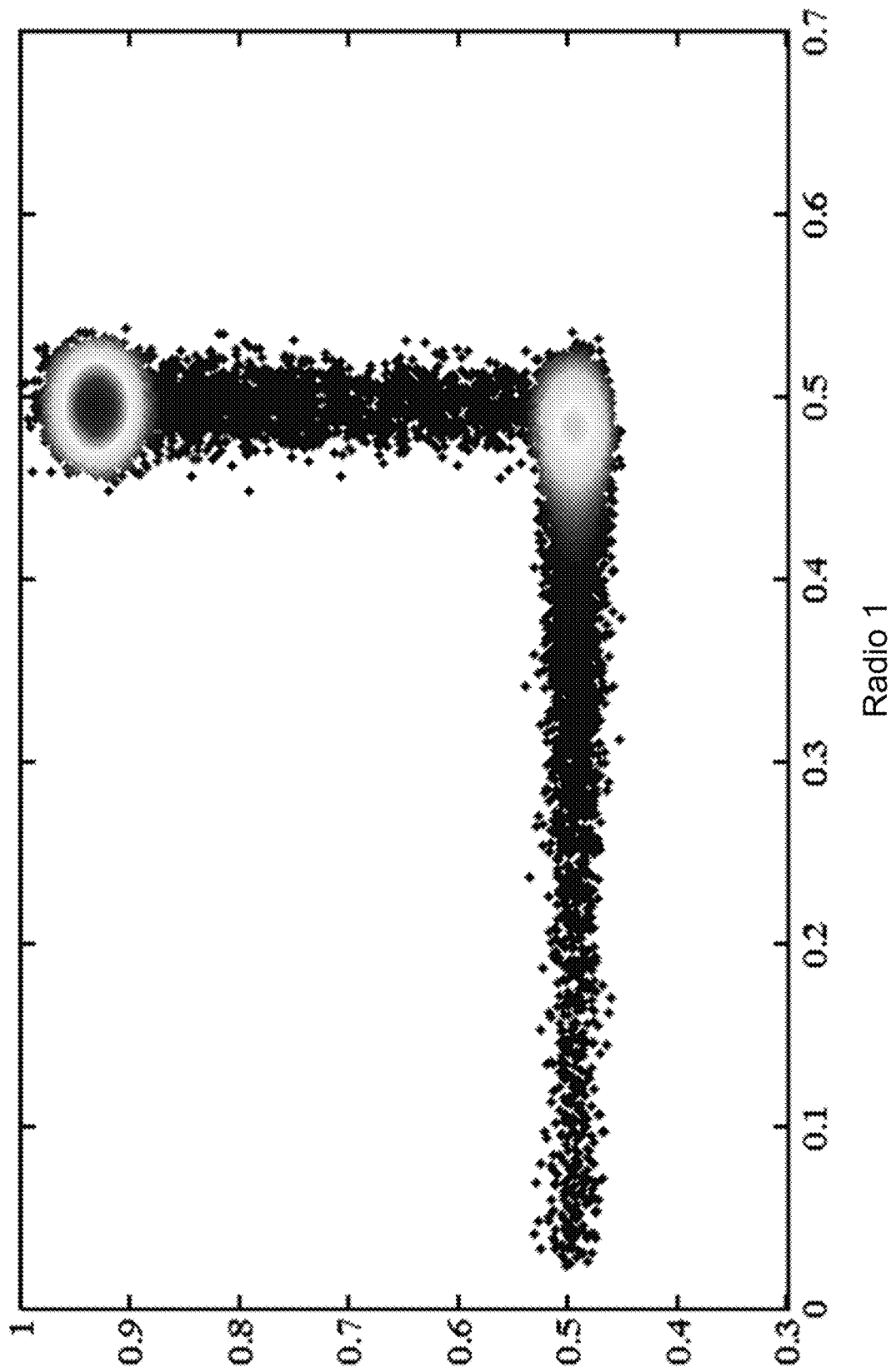
FIGS. 2a, 2b, 2c, 2d, and 2e show instantaneous envelope equipotential constellation trace figures of 5 radios according to an embodiment of the present disclosure.
Figure 2B:
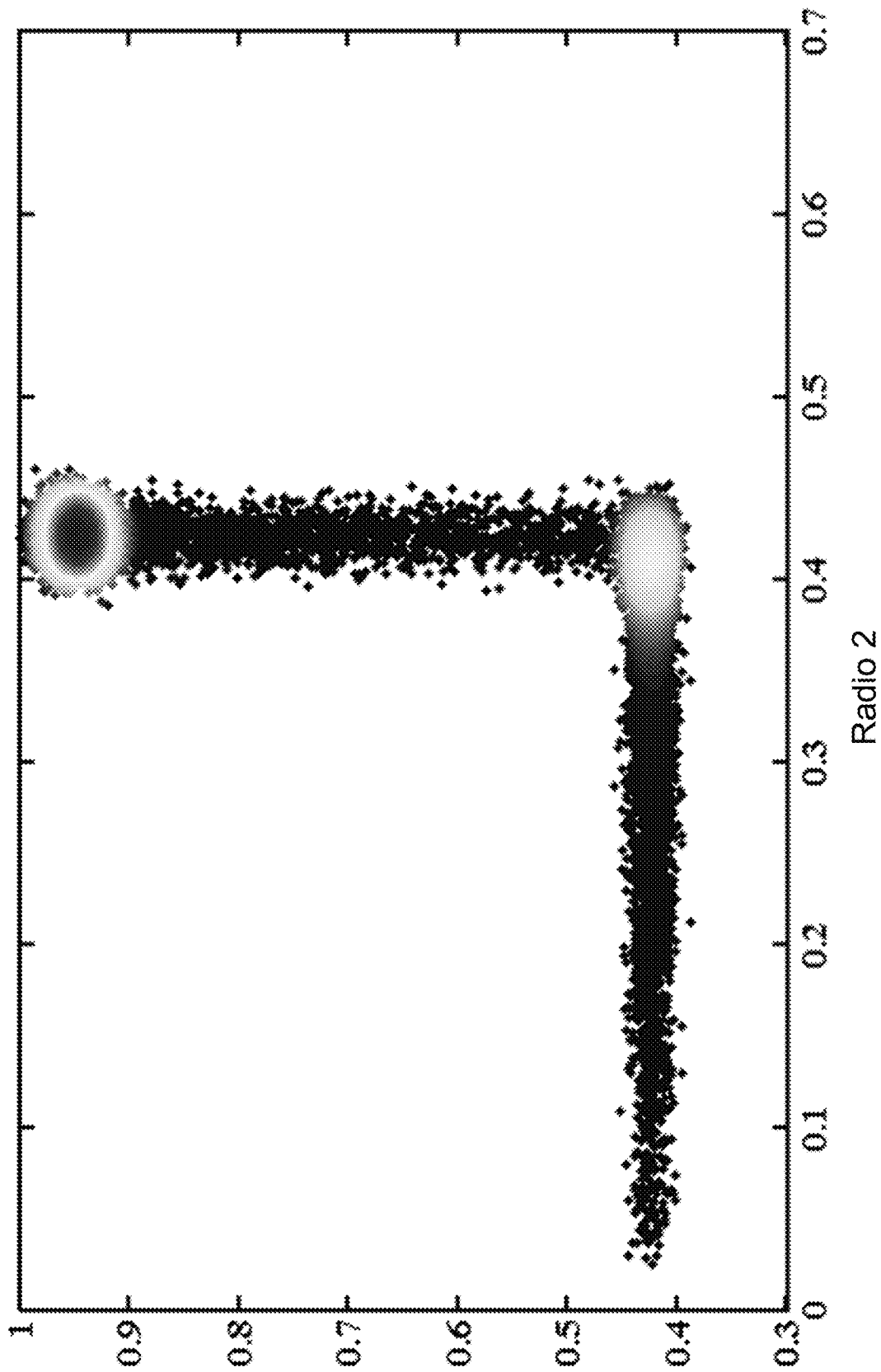
Figure 2C:
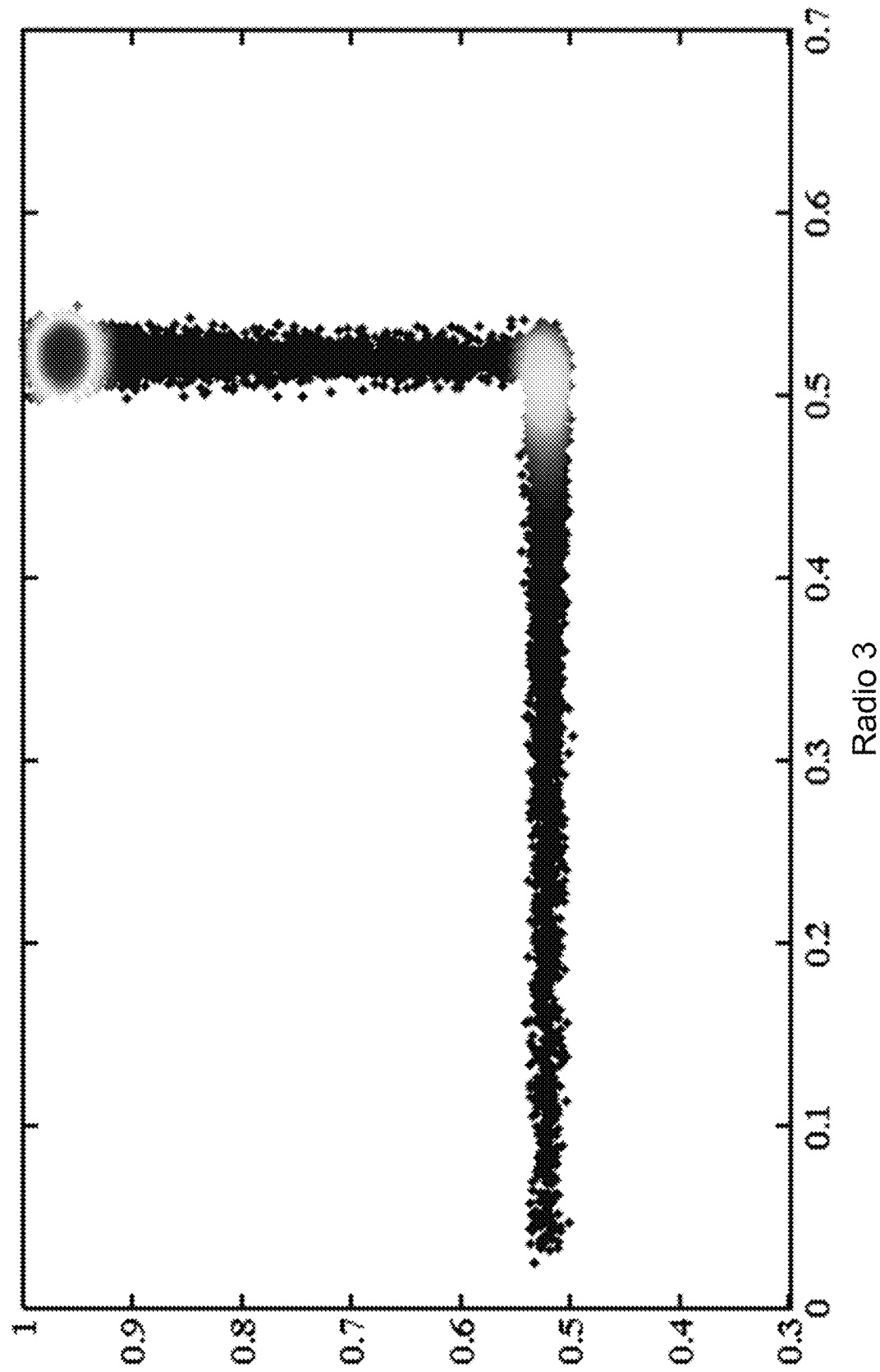
Figure 2D:
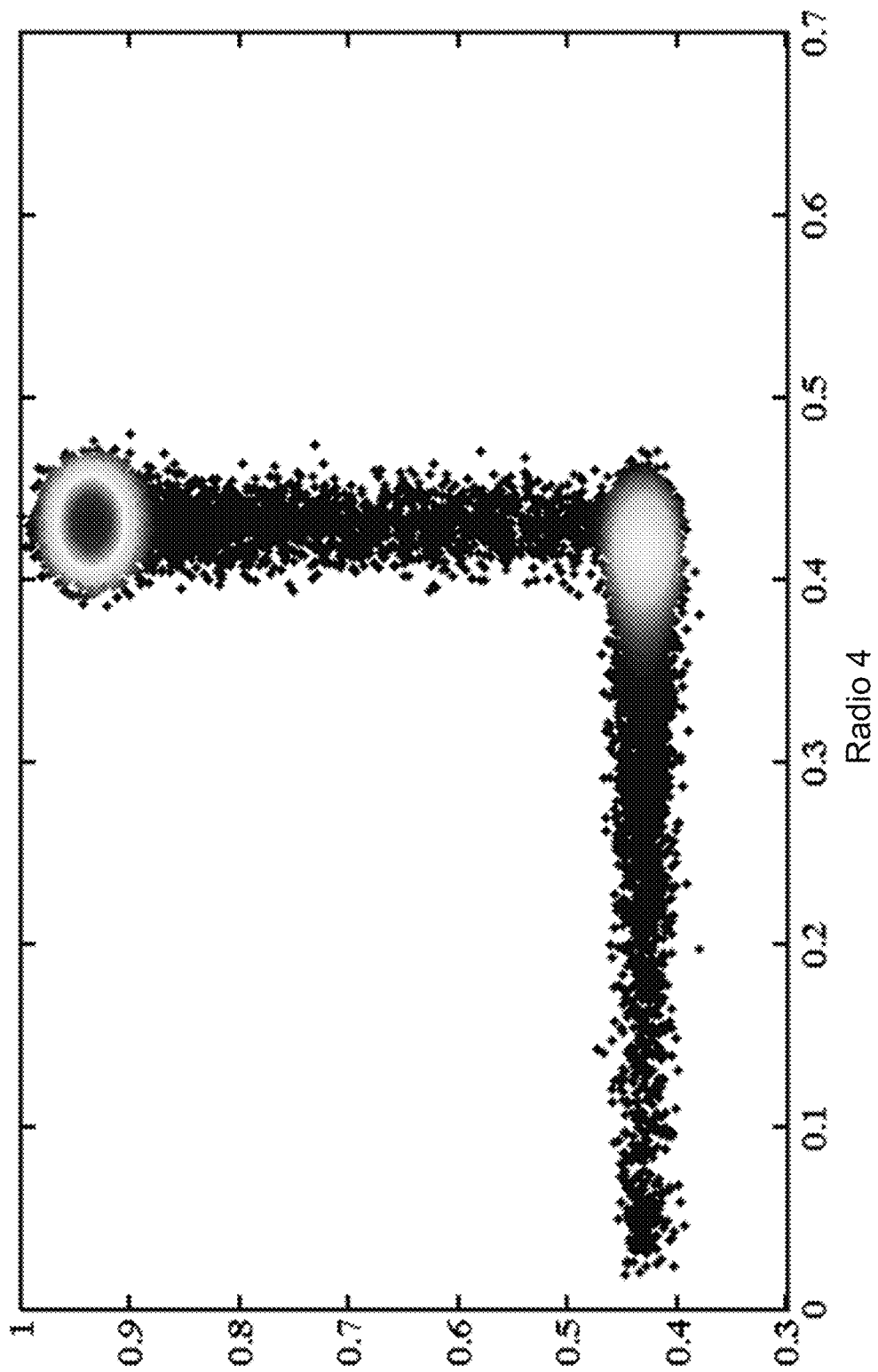
Figure 2E:
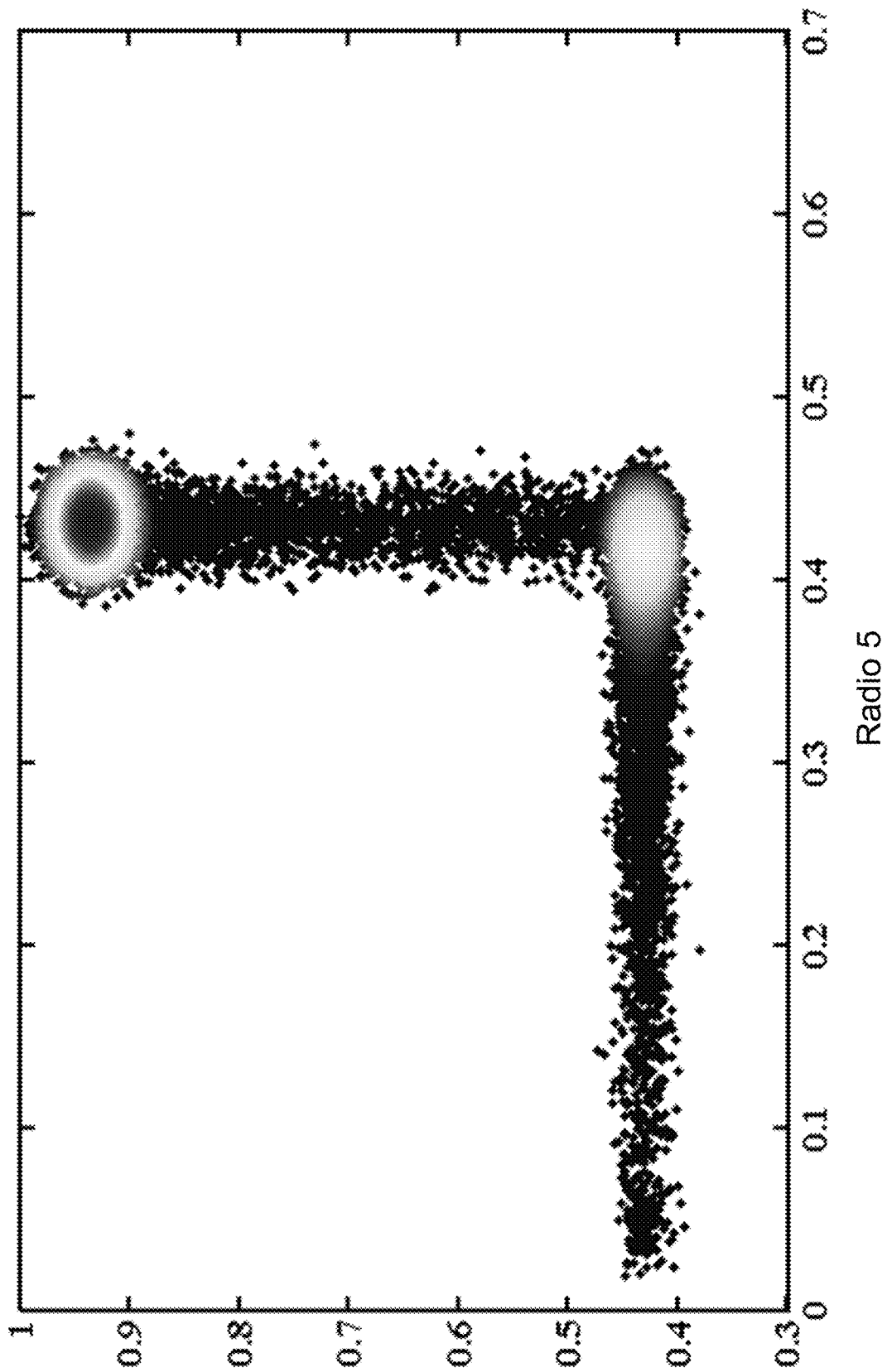

As shown in FIG. 1, a specific communication emitter identification method based on an instantaneous envelope equipotential constellation trace figure comprises:

Step 1: selecting a to-be-identified specific communication emitter, and acquiring, by a receiver, a radio frequency signal fragment of the specific communication emitter;

Step 2: performing instantaneous envelope fragment extraction to the radio frequency signal fragment of the specific communication emitter as acquired by the receiver, splitting the extracted instantaneous envelope fragment into two equal segments, and then representing the two equally split instantaneous envelope segments with a constellation trace figure using a constellation trace figure two-dimensional visualization method;

Step 3: computing point density on the constellation trace figure and coloring the constellation trace figure based on the point density to obtain a colored instantaneous envelope equipotential constellation trace figure for each segment of the radio frequency signal fragment, wherein the instantaneous envelope equipotential constellation trace figure serves as a radio frequency fingerprint for a transmitter;

Step 4: building a classifier, and inputting the radio frequency fingerprint of the transmitter obtained in step 3 into a classifier, thereby completing identification of specific communication emitter.

The radio frequency signal of the specific communication emitter acquired by the receiver in Step 1 refers to a transient signal.

The instantaneous envelope fragment in Step 2 is extracted using the Hilbert Transform.

Extracting the instantaneous envelope fragment using the Hilbert Transform method comprises steps of:

1.1 obtaining a radio frequency signal fragment as a real signal needed by resolving instantaneous envelope;

1.2 subjecting the radio frequency signal to the Hilbert Transform in accordance with the equation below:

$$\hat{x}(t) = x(t) * \frac{1}{\pi t}$$

where x(t) denotes the radio frequency signal fragment, $\hat{x}(t)$ denotes the Hilbert Transformed radio frequency signal fragment, and t denotes the time when the radio frequency signal fragment is intercepted;

1.3 with the radio frequency signal fragment as the real part and the Hilbert Transformed radio frequency fragment as the imaginary part, building an analytic signal and substituting the radio frequency signal fragment into the analytic signal to resolve the absolute value, wherein the signal obtained by resolving the absolute value of the analytic signal is an envelope signal, which is computed in accordance with the equation below:

$$\begin{cases} \tilde{x}(t) = x(t) + j\hat{x}(t) \\ x(t) = A(t)\cos(\omega_0 t + \theta(t)) \\ \tilde{x}(t) = A(t)\cos(\omega_0 t + \theta(t)) + jA(t)\sin(\omega_0 t + \theta(t)) = \\ \quad A(t)e^{j(\omega_0 t + \theta(t))} = A(t)e^{j\theta(t)}e^{j\omega_0 t} \\ |\tilde{x}(t)| = |A(t)e^{j\theta(t)}| = |A(t)| \end{cases}$$

where $\hat{x}(t)$ denotes the Hilbert Transformed radio frequency signal fragment, A(t) denotes amplitude component of the radio frequency signal fragment, $\cos(\omega_0 t+\theta(t))$ denotes phase component of the radio frequency signal fragment, $\sin(\omega_0 t+\theta(t))$ denotes phase component after the original signal of the radio frequency signal fragment is subjected to Hilbert Transform, $e^{j(\omega_0 t+\theta(t))}$ denotes the complex carrier signal derived after Euler transform, and $A(t) e^{j\theta(t)}$ denotes a complex envelope.

In Step 3, the constellation trace figure is colored by sliding a rectangular window function.

In Step 4, the classifier refers to a deep convolutional neural network classifier.

Building the deep convolutional neural network classifier includes steps as follows:

2.1 acquiring radio frequency signals of a plurality of to-be-identified specific communication emitters to obtain corresponding instantaneous envelope equipotential constellation trace figures based on the acquired radio frequency signals;

2.2 creating a dataset for training the deep convolutional neural network based on the obtained instantaneous envelope equipotential constellation trace figures of the radio frequency signals;

2.3 building a deep convolutional neural network model and training the deep convolutional neural network with the dataset, wherein the trained deep convolutional neural network model is the deep convolutional neural network classifier.

After training of the deep convolutional neural network classifier has been completed, a classifier verification sub-step needs to be further performed: selecting a plurality of specific communication emitters from among the specific communication emitters that have been used in training the deep convolutional neural network classifier, re-acquiring radio signals of the selected specific communication emitters, obtaining constellation trace figure verification images based on the selected radio frequency signals, inputting the obtained constellation trace figure verification images into the trained deep convolutional neural network classifier, and verifying classification accuracy of the deep convolutional neural network classifier.

10 radios of the same model and the same lot from the same manufacturer are selected to verify effectiveness and reliability of the specific communication emitter identification method based on an instantaneous envelope equipotential constellation trace figure, the process of which is described below:

10 radios of the same model and the same lot from the same manufacturer are selected as to-be-identified specific communication emitters; radio frequency signal fragments of the specific communication emitters are acquired using an oscilloscope in a laboratory LOS, wherein 50 sets of data are sampled from each radio, the sampling frequency is 40 MHz, and 159901 points are acquired from each set of data. The instantaneous envelope equipotential trace figures of the data as acquired by the oscilloscope are obtained as the radio frequency fingerprints of the radios. FIGS. 2 a, 2b, 2c, 2d, and 2e show that the instantaneous envelope equipotential constellation equipotential figures of the 5 radios have significant differences;

200 samples are randomly selected from among the 500 samples to build a classifier, and the remaining 300 samples are used for identification test, wherein for each radio, there are 20 training samples and 30 test samples. The 300 samples are inputted into the classifier to be subjected to specific communication emitter identification. The resulting average identification accuracies for the 10 radios can reach 100%, proving the effectiveness and reliability of the method.

Embodiment 2: a specific communication emitter identification method based on an instantaneous envelope equipotential constellation trace figure is provided, whose principle and implementation approach are basically identical to Embodiment 1, except that the specific communication emitter identification method in Embodiment 2 further comprises a step of optimizing the deep convolutional neural network classifier, the step specifically comprising:

S1: partitioning the constellation trace figure verification image of each training sample of a plurality of training samples included in a single specific communication emitter into 5 parts, which are respectively: head part of a first segment, intermediate part of the first segment, head part of a second segment, intermediate part of the second segment, and a connection part between the first segment and the second segment;

S2: computing pairwise similarities with respect to one of the parts of the plurality of training samples to obtain a plurality of similarities, computing the mean value of all similarities, and then computing variances between all similarities and the mean value, wherein a sum of the variances is taken as a confidence for the part;

S3: sorting the confidences of all parts in an ascending order, wherein a lower confidence indicates that the images with respect to a corresponding part are more similar, while a larger confidence indicates that the images with respect to a corresponding part are less similar; increasing identification weights for those parts with a lower confidence, and decreasing identification weights for those parts with a higher confidence.

In the classifier verification sub-step, if verification of a constellation trace figure verification picture inputted in the trained deep convolutional neural network classifier fails, an error correction sub-step is performed, specifically comprising:

T1: partitioning the constellation trace figure verification image into 5 parts, which are respectively: head part of a first segment, intermediate part of the first segment, head part of a second segment, intermediate part of the second segment, and a connection part between the first segment and the second segment, and also partitioning the corresponding training sample constellation trace figure verification image into 5 parts, which are respectively: head part of a first segment, intermediate part of the first segment, head part of a second segment, intermediate part of the second segment, and a connection part between the first segment and the second segment;

T2: selecting each part of the test constellation trace figure to match with each corresponding part of all training sample constellation trace figures, and recording the numbers of times of successful matching of each part of the test constellation trace figure, wherein the number of times of successful matching refers to the number of times for the match confidence to be greater than a set threshold.

T3: if the numbers of times of successful matching of all parts of the test constellation trace figure are unexceptionally greater than the set threshold, determining that the test constellation trace figure is the real constellation trace figure of the corresponding specific communication emitter, wherein the test constellation trace figure serves as a training sample constellation trace figure; if there exists a part whose number of times of successful matching is less than the set threshold in a test constellation trace figure and the part's confidence is high or above average, determining that the test constellation trace figure is the real constellation trace figure of the corresponding specific communication emitter, wherein the test constellation figure serves as a training sample constellation trace figure; if there exists a part whose number of times of successful matching in a test constellation trace figure is less than the set threshold and the part's confidence is not high or above average, which indicates an error correction failure, checking the system by relevant personnel.

What have been described above are only preferable modes of the present disclosure, not intended to limit the present disclosure in any form. Without departing from the technical solution limited in the appended claims, other variations and modifications are allowed.

What is claimed is:

1. A specific communication emitter identification method based on an instantaneous envelope equipotential constellation trace figure, comprising:
    Step 1: selecting a to-be-identified specific communication emitter, and acquiring, by a receiver, a radio frequency signal fragment of the specific communication emitter;
    Step 2: performing instantaneous envelope fragment extraction to the radio frequency signal fragment of the specific communication emitter as acquired by the receiver, splitting the extracted instantaneous envelope fragment into two equal segments, and then representing the two equally split instantaneous envelope segments with a constellation trace figure using a constellation trace figure two-dimensional visualization method;
    Step 3: computing point density on the constellation trace figure and coloring the constellation trace figure based on the point density to obtain a colored instantaneous envelope equipotential constellation trace figure for each segment of the radio frequency signal fragment, wherein the instantaneous envelope equipotential constellation trace figure serves as a radio frequency fingerprint for a transmitter,
    wherein in Step 3, the constellation trace figure is colored by sliding a rectangular window function;
    Step 4: building a classifier, and inputting the radio frequency fingerprint of the transmitter obtained in step 3 into a classifier, thereby completing identification of specific communication emitter.

2. The specific communication emitter identification method based on an instantaneous envelope equipotential constellation trace figure according to claim 1, wherein the radio frequency signal of the specific communication emitter acquired by the receiver in Step 1 refers to a transient signal.

3. The specific communication emitter identification method based on an instantaneous envelope equipotential constellation trace figure according to claim 1, wherein the instantaneous envelope fragment in Step 2 is extracted using the Hilbert Transform.

4. The specific communication emitter identification method based on an instantaneous envelope equipotential constellation trace figure according to claim 3, wherein extracting the instantaneous envelope fragment using the Hilbert Transform comprises steps of:
    Step 1.1: obtaining a radio frequency signal fragment as a real signal needed by resolving the instantaneous envelope;
    Step 1.2: subjecting the radio frequency signal to the Hilbert Transform in accordance with the equation below:

$$\hat{x}(t) = x(t) * \frac{1}{\pi t}$$

where: $x(t)$ denotes the radio frequency signal fragment, $\hat{x}(t)$ denotes the Hilbert Transformed radio frequency signal fragment, and t denotes the time when the radio frequency signal fragment is intercepted;
    Step 1.3: with the radio frequency signal fragment as the real part and the Hilbert Transformed radio frequency fragment as the imaginary part, building an analytic signal and substituting the radio frequency signal fragment into the analytic signal to resolve the absolute value, wherein the signal obtained by resolving the absolute value of the analytic signal is an envelope signal, which is computed in accordance with the equation below:

$$\begin{cases} \tilde{x}(t) = x(t) + j\hat{x}(t) \\ x(t) = A(t)\cos(\omega_0 t + \theta(t)) \\ \tilde{x}(t) = A(t)\cos(\omega_0 t + \theta(t)) + jA(t)\sin(\omega_0 t + \theta(t)) = \\ \qquad A(t)e^{j(\omega_0 t + \theta(t))} = A(t)e^{j\theta(t)}e^{j\omega_0 t} \\ |\tilde{x}(t)| = |A(t)e^{j\theta(t)}| = |A(t)| \end{cases}$$

where: $\hat{x}(t)$ denotes the Hilbert Transformed radio frequency signal fragment, $A(t)$ denotes amplitude component of the radio frequency signal fragment, $\cos(\omega_0 t+\theta(t))$ denotes phase component of the radio frequency signal fragment, $\sin(\omega_0 t+\theta(t))$ denotes phase component after the original signal of the radio frequency signal fragment is subjected to Hilbert Transform, $e^{j(\omega_0 t+\theta(t))}$ denotes the complex carrier signal derived after Euler transform, and $A(t)e^{j\theta(t)}$ denotes a complex envelope.

5. The specific communication emitter identification method based on an instantaneous envelope equipotential constellation trace figure according to claim 1, wherein in Step 4, the classifier refers to a deep convolutional neural network classifier.

6. The specific communication emitter identification method based on an instantaneous envelope equipotential constellation trace figure according to claim 5, wherein building the deep convolutional neural network classifier includes steps as follows:
    Step 2.1: acquiring radio frequency signals of a plurality of to-be-identified specific communication emitters to obtain corresponding instantaneous envelope equipotential constellation trace figures based on the acquired radio frequency signals;
    Step 2.2: creating a dataset for training the deep convolutional neural network based on the obtained instantaneous envelope equipotential constellation trace figures of the radio frequency signals;
    Step 2.3: building a deep convolutional neural network model and training the deep convolutional neural network with the dataset, wherein the trained deep convolutional neural network model is the deep convolutional neural network classifier.

7. The specific communication emitter identification method based on an instantaneous envelope equipotential constellation trace figure according to claim 5, wherein after training of the deep convolutional neural network classifier has been completed, a classifier verification sub-step needs to be further performed: selecting a plurality of specific communication emitters from among the specific communication emitters that have been used in training the deep convolutional neural network classifier, re-acquiring radio signals of the selected specific communication emitters, obtaining constellation trace figure verification images based on the selected radio frequency signals, inputting the obtained constellation trace figure verification images into the trained deep convolutional neural network classifier, and verifying classification accuracy of the deep convolutional neural network classifier.

8. The specific communication emitter identification method based on an instantaneous envelope equipotential constellation trace figure according to claim 7, further comprising a step of optimizing the deep convolutional neural network classifier, the step specifically comprising:

S1: partitioning the constellation trace figure verification image of each training sample of a plurality of training samples included in a single specific communication emitter into 5 parts, which are respectively: head part of a first segment, intermediate part of the first segment, head part of a second segment, intermediate part of the second segment, and a connection part between the first segment and the second segment;

S2: computing pairwise similarities with respect to one of the parts of the plurality of training samples to obtain a plurality of similarities, computing the mean value of all similarities, and then computing variances between all similarities and the mean value, wherein a sum of the variances is taken as a confidence for the part;

S3: sorting the confidences of all parts in an ascending order, wherein a lower confidence indicates that the images with respect to a corresponding part are more similar, while a larger confidence indicates that the images with respect to a corresponding part are less similar; increasing identification weights for those parts with a lower confidence, and decreasing identification weights for those parts with a higher confidence.

9. The specific communication emitter identification method based on an instantaneous envelope equipotential constellation trace figure according to claim 8, wherein in the classifier verification sub-step, if verification of a constellation trace figure verification image inputted in the trained deep convolutional neural network classifier fails, an error correction sub-step is performed, specifically comprising:

T1: partitioning the constellation trace figure verification image into 5 parts, which are respectively: head part of a first segment, intermediate part of the first segment, head part of a second segment, intermediate part of the second segment, and a connection part between the first segment and the second segment, and also partitioning the corresponding training sample constellation trace figure verification image into 5 parts, which are respectively: head part of a first segment, intermediate part of the first segment, head part of a second segment, intermediate part of the second segment, and a connection part between the first segment and the second segment;

T2: selecting each part of the test constellation trace figure to match with each corresponding part of all training sample constellation trace figures, and recording the numbers of times of successful matching of each part of the test constellation trace figure, wherein the number of times of successful matching refers to the number of times for the match confidence to be greater than a set threshold;

T3: if the numbers of times of successful matching of all parts of the test constellation trace figure are unexceptionally greater than the set threshold, determining that the test constellation trace figure is the real constellation trace figure of the corresponding specific communication emitter, wherein the test constellation trace figure serves as a training sample constellation trace figure; if there exists a part whose number of times of successful matching is less than the set threshold in a test constellation trace figure and the part's confidence is high or above average, determining that the test constellation trace figure is the real constellation trace figure of the corresponding specific communication emitter, wherein the test constellation figure serves as a training sample constellation trace figure; if there exists a part whose number of times of successful matching in a test constellation trace figure is less than the set threshold and the part's confidence is not high or above average, which indicates an error correction failure, checking the system by relevant personnel.

\* \* \* \* \*